W. Britton.
Tire Upsetting.
No. 78,719.   Patented Jun. 9, 1868.
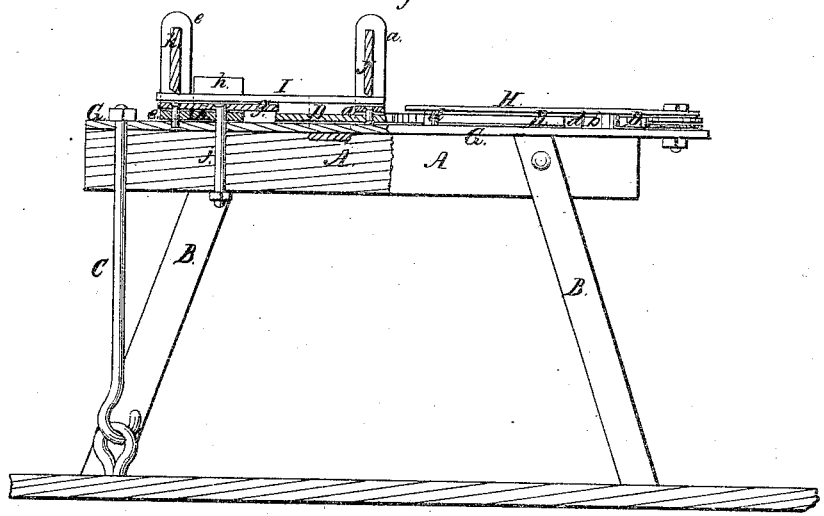
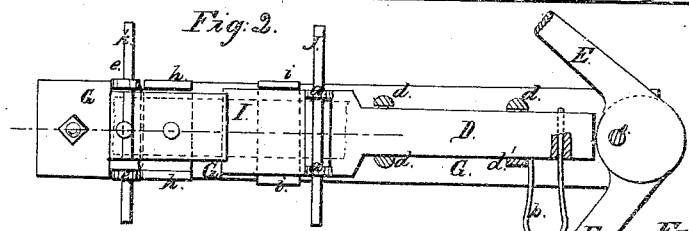
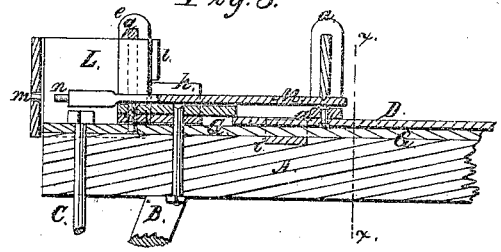 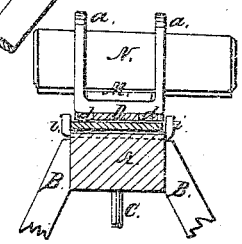
Witnesses:
H. C. Ashkettle
Wm A Morgan
Inventor:
Walter Britton
per Munn & Co
Attorneys

United States Patent Office.

WALTER BRITTON, OF ABINGDON, ILLINOIS.

Letters Patent No. 78,719, dated June 9, 1868.

---

IMPROVEMENT IN TIRE-SHRINKING AND PUNCHING MACHINE.

---

The Schedule referred to in these Letters Patent and making part of the same.

---

TO ALL WHOM IT MAY CONCERN:

Be it known that I, WALTER BRITTON, of Abingdon, in the county of Knox, and State of Illinois, have invented a new and useful Improvement in Tire-Shrinking and Punching Machine; and I do hereby declare that the following is a full, clear, and exact description thereof, which will enable others skilled in the art to make and use the same, reference being had to the accompanying drawings, forming part of this specification, in which—

Figure 1 is a side view of my improved machine, having a part thereof shown in section.

Figure 2 is a plan view of the same.

Figure 3 is a detail section of the same.

Figure 4 is a detail cross-section through the line $x\,x$, fig. 3.

Similar letters of reference indicate like parts.

The object of this invention is to accomplish the shrinking of wheel-tire in an improved manner. It consists of the parts set forth in the following:

The general frame of the machine is shown at A, having legs, B, and a rod, C, for holding the machine to the floor. The plate D is provided with slotted lugs $a\,a$, bolted or otherwise affixed to it, as shown, and this plate is actuated forward by the cam-levers E, and returned by the spring $b$.

The lugs $e\,e$ are bolted to the plate G by the bolt $c$, which passes through the frame-plate G, as shown. The top plate H, which covers the plate D in part, is connected with the frame-plate G by means of bolts or rivets $d\,d\,d\,d$, which also serve as guides to the plate D in its to-and-fro movement. The spring $b$ is affixed to bolt $d'$, and its reduced end rests in a hole in the plate D, as shown.

The bolt in plate $g$ serves to clamp the angular guide-plates $h$ to the frame A, and also assists to hold the lug-plate $e$ more firmly. It also serves to provide a rest for the tire I, (when the same is being shrunk,) and to hold the same level with the bottom of the lugs $a\,a$, as shown.

The tire is held firmly to the plate D by a key, J, which is slightly tapered, and is driven through the slotted lugs $a\,a$, as shown.

A similar key, K, holds the tire fast to the plate $g$. When the cam-levers are in the position shown, the plate D is at its remotest position from the lugs $e\,e$.

The heated tire is placed in the lugs and keyed fast, and the cam-levers being actuated backward, the tire is compressed or shrunk, as will be obvious.

The angular plate $i$ serves as a guide for the front end of the plate D, as shown.

When the machine is to be used for punching holes, a rest-plate, L, having clamp-edges, $l$, is set on the frame, in the position shown, the said clamp-edges bearing against the lugs $e\,e$, thereby sustaining the thrust strain upon that point, the punchings passing through the hole $m$ in the ordinary manner.

The punching-plate M is provided with a corresponding punching-point, $n$. This plate is held by a tapered key, N, as shown at fig. 4.

The punching-plate being thus keyed to the plate D, is actuated by the cam-levers in the obvious manner.

The bolt $o$, upon which the cam-levers vibrate, passes through the top plate H and the frame-plate G, as shown.

This machine is simple, of small cost, and easily operated, and supplies a want long felt in small smitheries. A smaller key, $q$, holds the plate L firmly in place.

Having thus described my invention, I claim as new, and desire to secure by Letters Patent—

1. The plate D, bearing slotted lugs $a\,a$, the cam-levers E E, spring $b$, in combination with the frame-plate G, slotted lugs $e\,e$, all constructed, arranged, and operating substantially as shown and described, and for the purpose set forth.

2. The plate and punch M and $n$, and stirrup L, for joint use with the subject-matter of the preceding claim, in the manner and for the purpose described.

WALTER BRITTON.

Witnesses:
J. M. YOUNG,
A. D. W. GILLASPIE.